United States Patent [19]

Pittas

[11] 4,092,032
[45] May 30, 1978

[54] ASSEMBLY KIT FOR ERECTING DEMOUNTABLE FRAME STRUCTURES

[75] Inventor: Andrew Christo Pittas, London, England

[73] Assignee: Pittas Engineering Designs Limited, London, England

[21] Appl. No.: 802,574

[22] Filed: Jun. 1, 1977

[30] Foreign Application Priority Data

Jun. 4, 1976 United Kingdom ............... 23242/76

[51] Int. Cl.² ............................................... B62B 3/02
[52] U.S. Cl. ...................................... 280/30; 211/189; 248/165; 280/47.18; 297/440
[58] Field of Search ............... 280/30 R, 47.18, 47.34, 280/79.3, 7.1; 312/257 SK; 297/440; 248/165, 440, 188.1; 211/189

[56] References Cited

U.S. PATENT DOCUMENTS

| | | | |
|---|---|---|---|
| 1,460,928 | 7/1923 | Tilden | 280/79.3 X |
| 1,891,393 | 12/1932 | Oppenlander | 280/79.3 X |
| 2,937,062 | 5/1960 | Kruse | 211/189 X |
| 2,989,142 | 6/1961 | Gill | 248/165 X |
| 3,386,590 | 6/1968 | Gretz | 211/189 |
| 4,009,762 | 3/1977 | Bjerkgard | 280/30 R X |
| 4,033,537 | 7/1977 | Pridham | 248/165 X |

FOREIGN PATENT DOCUMENTS

952,140  4/1949  France ................. 211/189

Primary Examiner—Joseph F. Peters, Jr.
Assistant Examiner—Terrance L. Siemens
Attorney, Agent, or Firm—Foster York

[57] ABSTRACT

An assembly kit comprising primary, secondary and intermediate sub-frames of tubular material which are all telescopically connectable to each other for erecting demountable frame structures.

Each primary sub-frame has two side members and two cross members connected to the side members at positions spaced from the ends of the side members by a fixed distance. Two pairs of legs, having a length equal to the fixed distance, project respectively from the junctions of the side members and the cross members to one side of the side members.

Each secondary sub-frame has two "L"-shaped side members and two cross members connected, respectively to the junctions of the arms of the "L"-shaped side members and at positions spaced by said fixed distance from the free ends the long arms of the "L"-shaped side members. The "L"-shaped side members are of tubular material which is a sliding fit on the tubular material of each primary sub-frame and have short arms equal in length to the fixed distance.

Each intermediate sub-frame has two side members and two cross members and has similar dimensions to each primary sub-frame. However, one end portion of each side member, having a length equal to the fixed distance, is of the same size tubular material as the secondary sub-frame.

Both ends and both pairs of legs of each primary sub-frame and one end of each intermediate sub-frame are therefore telescopically engageable, over said fixed distance, with both ends of each secondary sub-frame and one end of each other intermediate frame.

8 Claims, 17 Drawing Figures

ASSEMBLY KIT FOR ERECTING DEMOUNTABLE FRAME STRUCTURES

BACKGROUND OF THE INVENTION

The invention relates to an assembly kit for erecting demountable frame structures.

In recent years, there has been a growing enthusiasm for "Do-It-Yourself" activities and the practice of purchasing "knocked-down" items, from simple articles of furniture such as tables to wardrobes and complete kitchen installations including cupboards and sinks, has become very popular. However, the unassembled kits provided for erecting these items are only capable of assembly in one way to produce the desired article. Moreover, some of these kits require considerable skill to effect assembly. These kits do not commend themselves to people who lack confidence in their own skill.

It has also been found that people undergoing occupational therapy, to improve their manual dexterity after sickness or accidental injury, or to provide relaxing diversion to people recovering from emotional disturbances or undergoing geriatric treatment, require tasks involving different demands on skill. In the past, the effectiveness of this treatment has been limited by the triviality of the tasks which these people have been given and the repetitive nature of these tasks limits the beneficial effect of the treatment.

SUMMARY OF THE INVENTION

It is therefore an object of the present invention to provide a kit of parts which may be assembled into different arrangements, involving different degrees of complexity, depending on the number of parts in the kit.

According to the invention, there is provided an assembly kit, for erecting demountable frame structures, comprising at least one primary sub-frame, at least one secondary sub-frame and at least one extension sub-frame, in which each primary sub-frame comprises two identical tubular side members, two equal length cross members extending perpendicularly between the side members from portions of the side members which are spaced a first distance apart and respectively spaced by a second distance from opposite ends of the side members and four tubular legs, of equal length and having the same cross-section as the side members, extending from said portions of the side members to one side of a plane defined by the axes of the side members and the cross members, with the axes of the legs extending perpendicular to the axes of adjacent cross members and defining two planes respectively passing through the axes of the cross members and being equally inclined to the adjacent ends of the side members; each secondary sub-frame comprises two identical tubular "L"-shaped side members which each have an internal cross-section providing a sliding fit over the external cross-section of the opposite ends of the side members and the legs of each primary sub-frame and first and second arms having lengths respectively equal to a third distance greater than said second distance and to said second distance, a first cross member extending perpendicularly between the longer arms of the "L"-shaped side members from portions of the "L"-shaped side members respectively spaced from the free ends of said longer arms by a distance equal to said second distance and a second cross member extending perpendicularly between the junctions of the two arms of both "L"-shaped side members so that said junctions both engage the same side of the second cross-member at opposite ends of the second cross-member; and each extension sub-frame comprises two identical tubular side members of the same length as the side members of each primary sub-frame and two cross-members both equal in length to the cross members of each primary sub-frame and extending perpendicularly from the side members of the extension sub-frame from portions of the side members of the extension sub-frame respectively spaced by said second distance from opposite ends of the side members of the extension sub-frame, the side members of the extension sub-frame respectively comprising long portions of the same external cross-section as the side members and legs of each primary sub-frame and adjacent short portions, at one end of the extension sub-frame, having a length equal to said second distance and an internal cross-section which is a sliding fit over the external cross-sections of the side members and legs of each primary sub-frame.

Clearly, the number of items which can be assembled from a basic kit containing only three sub-frames is limited, but kits may be provided with two or more of at least one of the sub-frames to increase the range of articles which can be assembled.

Although the legs of the primary sub-frames may extend perpendicular to the plane defined by the axes of the side members and the cross members, it is preferred that these legs are inclined at 45° to the adjacent ends of the side members.

To increase the versatility of the kits, the second cross-member of the secondary sub-frames may be tubular and formed, at opposite ends, with peripheral slots and two resiliently expansible loops may be mounted on the second cross member of each secondary sub-frame for engagement of rigid portions of these loops, through the slots, with peripheral grooves formed on extensions of stub axles of wheels so as to prevent axial withdrawal of the stub axles from the second cross-member. By this means, it is possible to provide an assembly formed from the kit with wheels. In this case, each loop of resilient material may be formed with a necked portion separating a larger portion which is able to rotate about the external cross-section of the second cross-member of the secondary sub-frame and a smaller portion which, when aligned with one of the peripheral slots in the second cross-member of the second sub-frame, projects into the internal cross-section of the second cross member of the secondary sub-frame to engage in the peripheral groove formed on the extension of one of said stub axles.

In an alternative form of construction, each resiliently expansible loop comprises a rigid portion, such as a metal rod, for engagement with one of the peripheral grooves formed on the extensions of the stub axles, and a pliable, resiliently extensible portion, such as a rubber band or a helical tension spring which is looped over opposite ends of the metal rod.

The opposite ends of the side members and the free ends of the legs of each primary sub-frame and the ends of the long portions of each extension sub-frame may be provided with stoppers which each have an annular rim of the same external cross-section as the tubular members into which they fit. Moreover, at least one end of the secondary sub-frame, may be provided with a sleeve of elastomeric material having an inwardly directed flange defining a circular aperture which is capable of a friction fit with the external cross-section of the ends of the side members and the legs of each primary sub-frame. The free ends of the short portions of the side members of each extension sub-frame may also be provided with similar sleeves of elastomeric material so that each sleeve has an inwardly directed flange defining a circular aperture which is capable of a friction fit with the external cross-section of the end of the side members and legs of each primary sub-frame.

DESCRIPTION OF THE DRAWINGS

Embodiments of the invention are hereinafter described, by way of example, with reference to the accompanying drawings, in which.

DESCRIPTION OF THE ILLUSTRATIVE EMBODIMENTS

Figure 1:
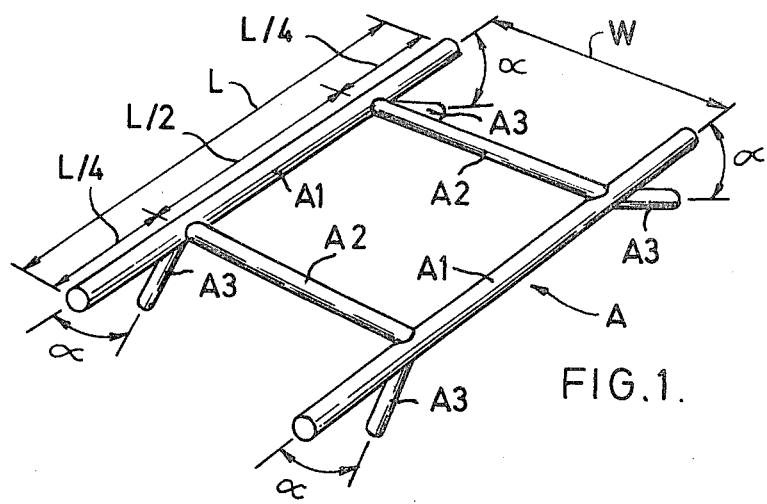
FIGS. 1 to 3 are isometric views of primary, secondary and extension sub-frames forming parts of a kit according to the invention.
Figure 2:
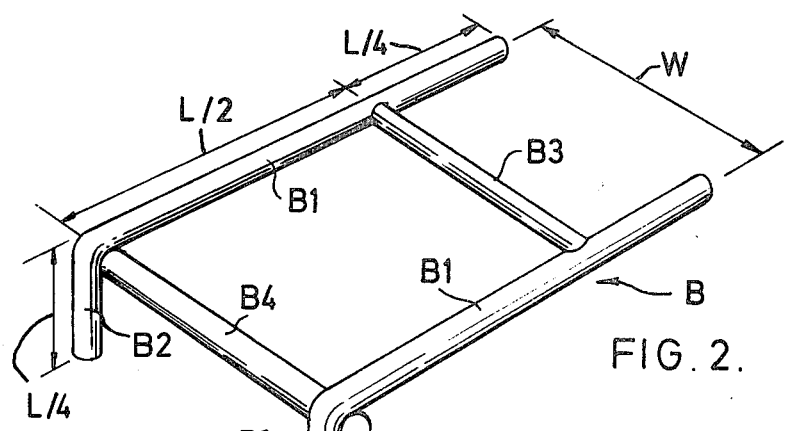

As shown in FIG. 1 a primary sub-frame A has two side members A1 of three quarter inch outside diameter steel tube of length L equal to 14 inches. Two cross members A2 of three-quarter inch outside diameter steel tube are welded to the side members A1 at the quarter points of the side members A1. Four legs A3 of three quarter inch outside diameter steel tube are welded to the side members A1 at the junctions between the side members A1 and the cross members A2 so as to be inclined at angle $\alpha$ equals 45° to the opposite ends of the side members A1. The side members A1 are thus disposed on parallel axes separated by a distance W equal to thirteen and one quarter inches. As shown in FIG. 2, a secondary sub-frame B has two side members of seven-eighth inch outside diameter steel tube. Each such side member is bent at right angles to form a long arm B1 having a length of three quarters L and a short arm B2 having a length of one quarter L. The two side members are disposed on axes separated by a distance W equals thirteen and one quarter inches and are interconnected by first and second cross-members B3 and B4 of seven eighth inch outside diameter steel tube. The first cross member B3 is welded at opposite ends to inside portions of the side members spaced one quarter L from the free ends of the arms B1 and the second cross member B4 is welded, at opposite ends, to the inside surface of a crash-bend separating the two arms B1 and B2 of the side member. As shown, the second cross member B4 extends the whole width of the secondary sub-frame B.

Figure 3:
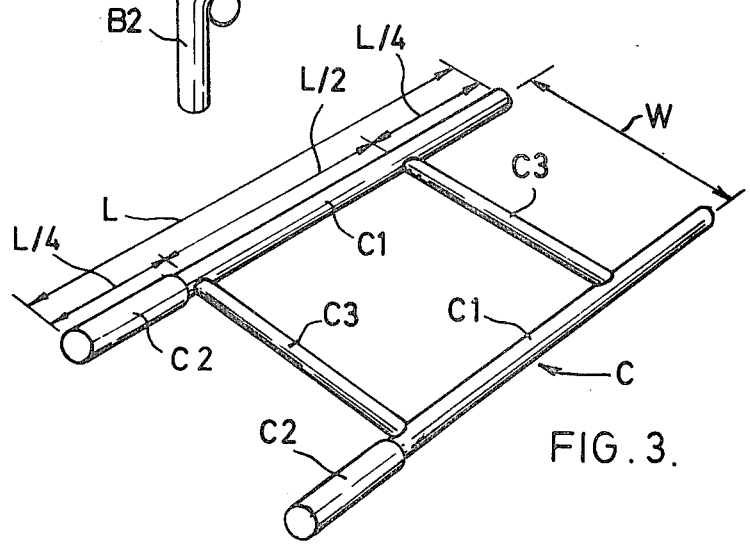

As shown in FIG. 3, the extension sub-frame C consists of two side members disposed on parallel axes separated by a distance W equals thirteen and one quarter inches and each side member consists of a long portion C1 having a length of three quarters L of three quarter inch outside diameter steel tube and a short portion C2 having a length of one quarter L of seven eighth inch outside diameter steel tube. The two side members C1 are interconnected by cross members C3 of three quarter inch outside diameter steel tube which are welded to the long portions C1 of the side members.

Figure 4:
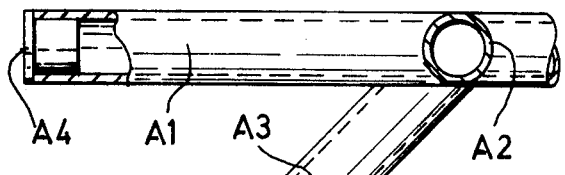
FIGS. 4 and 5 are part-sectional views of portions of primary and secondary sub-frames shown in FIGS. 1 and 2.

As shown in FIG. 4, the open ends of the side members A1 and the legs A3 of the primary sub-frame A are fitted with plastics stoppers A4 which are formed with annular rims having the same external cross-section as the three quarter inch outside diameter steel tube. Similar stoppers may be fitted to the free ends of the long portions C1 of the extension sub-frame C.

Figure 5:
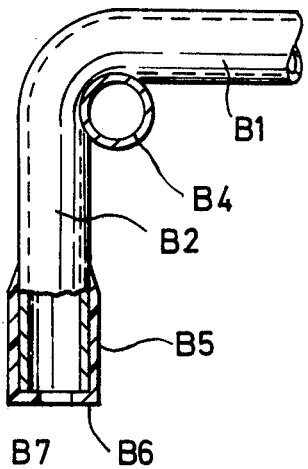

As shown in FIG. 5, the short arm B2 of the side member of the secondary sub-frame B is fitted with a plastics sleeve B5 having an inwardly directed flange B6 defining a circular aperture B7 which is capable of a frictional fit with tubular steel of three quarter inch outside diameter. A similar sleeve may be fitted to the free end of the long arm B1 of the secondary sub-frame B and the short portion C2 of each side member of the extension sub-frame C. These sleeves B5 may also be replaced, where necessary, with similar sleeves having no aperture B7, so as to close the end of the tubular members to which they are fitted.

Figure 6:
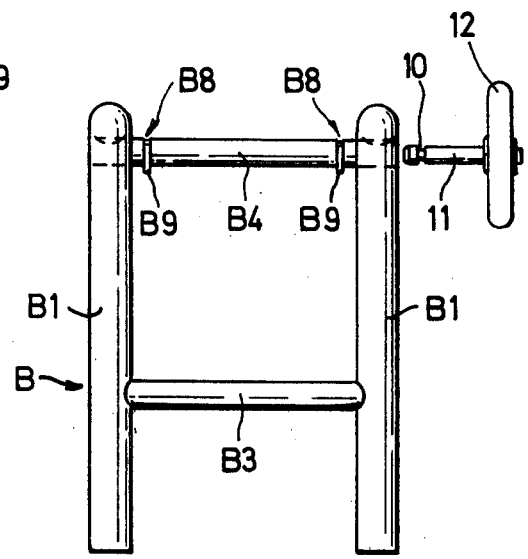
FIG. 6 is a side elevation of a further modified form of the secondary sub-frame shown in FIG. 2.

As shown in FIG. 6, the second cross member B4 of the secondary sub-frame B may be formed with peripherally extending slots B8 and loops B9 of spring steel may be mounted on the second cross member B4 in order to engage in slots B8. In this case, the loops B9 can engage in peripheral grooves 10 formed in extensions 11 of stub axles carrying wheels 12. Although not shown, a wheel 12 may thereby be mounted on each side of the secondary sub-frame B.

Figure 7:
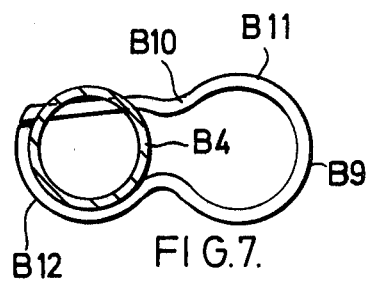
FIGS. 7 and 8 are schematic views showing part of the secondary sub-frame shown in FIG. 6.
Figure 8:
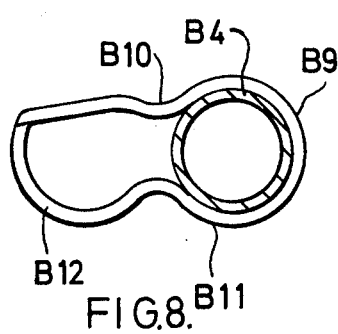

As shown in FIGS. 7 and 8, each spring steel loops B9 has a necked portion B10 separating larger and smaller portions B11 and B12 which are respectively capable of rotating freely on the second cross member B4 and gripping the second cross member B4 so that part of the loop passes through the appropriate slot B8 to engage in the peripheral groove 10 formed on the extension 11 of the stub axle. Thus, to secure a stub axle of a wheel 12, it is merely necessary to move the loop B9 until the second cross member B4 is enclosed in the larger portion B11 before inserting the extension 11 of the stub axle. The necked portion B10 of the loop B9 is then pressed over the second cross member B4 so as to embrace the second cross member B4 with the smaller portion B12 of the loop B9. To release the stub axle it is merely necessary to press the loop B9 in the opposite direction so as to withdraw the loop from the slot B8 and to rest the loop with the larger portion B11 surrounding an adjacent portion of the second cross member B4. Although the loop B9 is shown as having a gap, a continuous loop may also be used.

Figure 9:
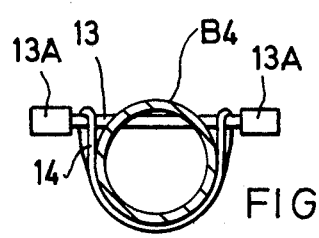
FIG. 9 is a cross-sectional view similar to FIG. 7, but showing an alternative form of resiliently expansible loop.
Figure 10:
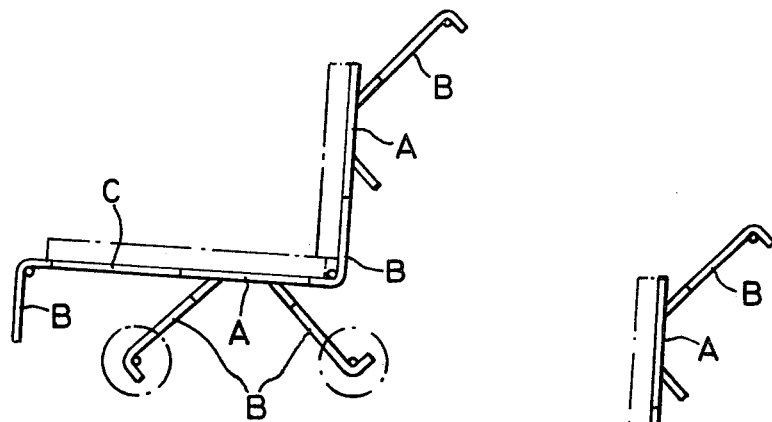
FIGS. 10 to 17 are schematic illustrations of a number of articles constructed from kits comprising primary, secondary and extension sub-frames of kits according to the invention.
Figure 11:
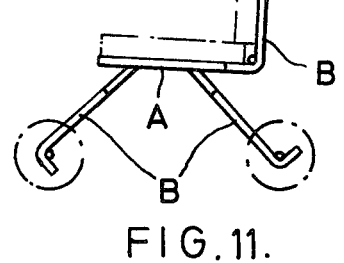
Figure 13:
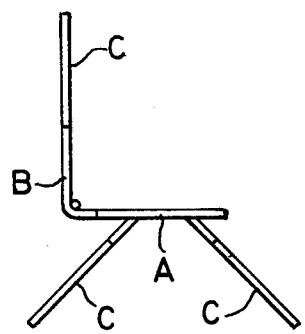
Figure 12:
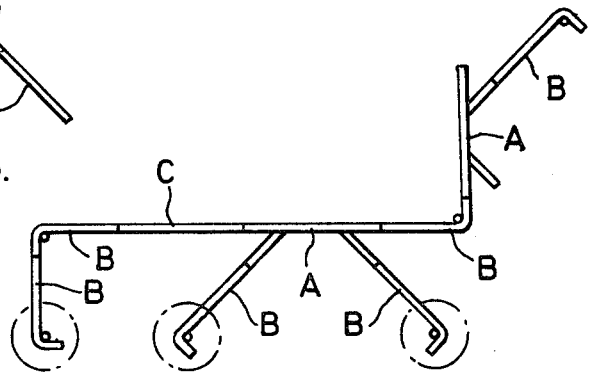
Figure 14:
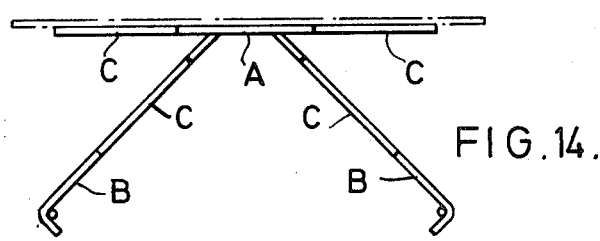
Figure 15:
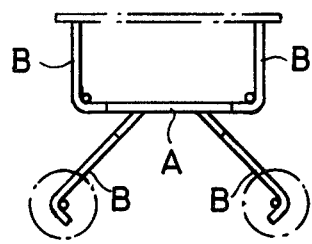
Figure 16:
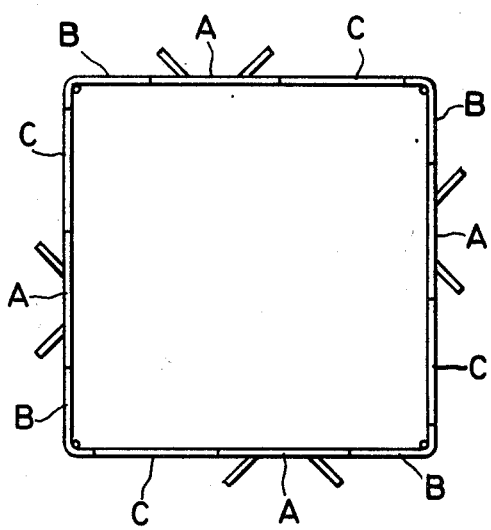
Figure 17:
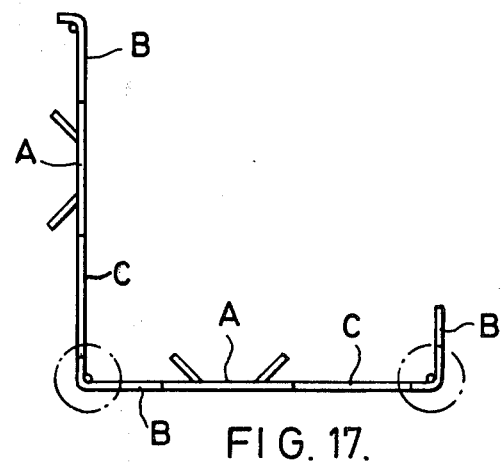

The alternative form of resiliently extensible loop shown in FIG. 9 consist of a steel rod 13, provided with two plastics heads 13A, and a rubber band 14 which is looped over the rod 13 and retained by the heads 13A so as to releasably locate the rod 13 in the slot B8 where it engages in the peripheral groove 10.

As shown in FIGS. 10 to 17, different combinations of primary, secondary and extension sub-frames, marked A, B and C, are combined to form an invalid's wheelchair, a child's wheelchair, a perambulator frame, a chair frame, an ironing frame, a wheeled trolley frame, a child's play-pen and a porter's four wheeled trolley.

Each of the articles shown in FIGS. 10 to 17 can be assembled from one or more basic kits having one primary sub-frame, one secondary sub-frame and one extension sub-frame. Of course, the kits may be provided with additional sub-frames for particular purposes or individual sub-frames can be taken from other kits.

Where it is required to fasten two sub-frames more securely than is provided by the telescopic engagement between these two sub-frames, straps of pliable material may be looped around adjacent cross-members of the two adjacent sub-frames.

To facilitate connection of a secondary frame B or an extension frame C to the legs A3 of each primary frame A, the legs A3 are preferably at least 3½ inches long, i.e. they have a length of at least L/4.

I claim:

1. An assembly kit, for erecting demountable frame structures, comprising at least one primary sub-frame, at least one secondary sub-frame, connectable to said primary frame, and at least one extension sub-frame connectable to said primary frame and to said secondary frame, in which:

each primary sub-frame comprises:
two identical tubular side members which each have opposite ends, intermediate portions respectively spaced a first distance apart, and end portions extending to said opposite ends from said intermediate portions,
two equal length cross members extending perpendicularly between the side members from said intermediate portions of the side members which are spaced a first distance apart and respectively spaced by a second distance from said opposite ends of the side members, and
four tubular legs, of equal length and having a free end and the same cross-section as the side members, extending from said intermediate portions of the side members to one side of a plane defined by the axes of the side members and the cross members with the axes of the legs extending perpendicular to the axes of adjacent cross members and defining planes respectively passing through the axes of the cross members and being equally inclined to the adjacent end portions of the side members;

each secondary sub-frame comprises:
two identical tubular "L"-shaped side members which each have an internal cross-section providing a sliding fit over the external cross-section of the end portions of the opposite ends of the side members and the legs of each primary sub-frame, first and second arms having lengths respectively equal to a third distance greater than said second distance and to said second distance, and a junction between said first and second arms, each first arm having a free end and an intermediate portion spaced from said free end by a distance equal to said second distance,
a first cross member extending perpendicularly between the first arms of the "L"-shaped members from said intermediate portions of the first arms of the "L"-shaped side members respectively spaced from said free ends of said first arms by a distance equal to said second distance, and
a second cross member extending perpendicularly between the junctions of the two arms of both "L"-shaped side members so that said junctions both engage the same side of the second cross member at opposite ends of the second cross member; and each extension sub-frame comprises:
two identical tubular side members, and
two cross members both equal in length to the cross members of each primary sub-frame and extending perpendicularly from the side members of the extension sub-frame from said intermediate portions of the side members of the extension sub-frame respectively spaced by said second distance from said opposite ends of the side members of the extension sub-frame, the side members of the extension sub-frame respectively comprising long portions of the same external cross-section as the side members and legs of each primary sub-frame and adjacent short portions each having a free end, a length equal to said second distance and an internal cross-section which is a sliding fit over the external cross-sections of the side members and legs of each primary sub-frame.

2. An assembly kit, according to claim 1, in which the legs of each primary sub-frame are inclined at 45° to the adjacent end portions of the side members of the primary sub-frame.

3. An assembly kit, according to claim 1, further comprising two stub axles for wheels, each having an extension formed with a peripheral groove, in which:
the second cross member of each secondary sub-frame is tubular and has opposite ends formed with peripheral slots;
the extensions are rotatable within said opposite ends of said second cross member; and
two resiliently expansible loops are mounted on the second cross member of the secondary sub-frame for engagement, through the slots, with said peripheral grooves formed on said extensions of the stub axles so as to prevent axial withdrawal of the stub axles from the second cross member of the secondary sub-frame.

4. An assembly kit, according to claim 3, in which:
each resiliently expansible loop is of resilient material and has a larger portion which is able to rotate about the external cross-section of the second cross member of the secondary sub-frame, a smaller portion which, when aligned with one of the peripheral slots in the second cross member of the secondary sub-frame, projects into the internal cross-section of the second cross member of the secondary sub-frame to engage in the peripheral grooves formed on the extension of one of said stub axles, and a necked portion interconnecting the larger and smaller portions of said resiliently expansible loop.

5. An assembly kit, according to claim 3, in which the loops each comprise a rigid portion, for engagement with one of the peripheral grooves, and a pliable, resiliently extensible portion.

6. An assembly kit, according to claim 1, in which:
stoppers are provided for the opposite ends of the side members and the free ends of the legs of each primary sub-frame and the ends of the long portions of the side members of each extension sub-frame; and
the stoppers each have an annular rim of the same external cross-section as the tubular members to which they are fitted.

7. An assembly kit, according to claim 1, in which:
at least one pair of adjacent ends of side members of each secondary sub-frame are respectively provided with sleeves of elastomeric material; and
each sleeve has an inwardly directed flange defining a circular aperture which is capable of a friction fit with the external cross-section of the end portions of the side members and the legs of each primary sub-frame and the ends of the long portions of the side members of each extension sub-frame.

8. An assembly kit, according to claim 1, in which:
the free ends of the short portions of the side members of each extension sub-frame are provided with sleeves of elastomeric material; and
each sleeve has an inwardly directed flange defining a circular aperture which is capable of a friction fit with the external cross-section of the end portions of the side members and the legs of each primary sub-frame.

* * * * *